(12) United States Patent
Chartrand

(10) Patent No.: US 8,422,657 B1
(45) Date of Patent: *Apr. 16, 2013

(54) TELECOMMUNICATIONS SYSTEM WITH IMPROVED COUNTRY CODES AND AREA CODES

(76) Inventor: Victor Chartrand, La Quinta, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 12/928,181

(22) Filed: Dec. 6, 2010

Related U.S. Application Data

(63) Continuation-in-part of application No. 12/228,717, filed on Aug. 15, 2008, now Pat. No. 7,848,508.

(60) Provisional application No. 60/965,379, filed on Aug. 17, 2007.

(51) Int. Cl.
*H04M 7/00* (2006.01)
*H04M 1/56* (2006.01)

(52) U.S. Cl.
USPC .................................. 379/221.14; 379/142.1

(58) Field of Classification Search ................ 379/142.1, 379/211.02, 212.01, 221.14
See application file for complete search history.

(56) References Cited

U.S. PATENT DOCUMENTS

| | | | |
|---|---|---|---|
| 3,634,631 A | 1/1972 | Youngs | |
| 3,870,821 A | 3/1975 | Steury | |
| 5,018,191 A | 5/1991 | Catron et al. | |
| 5,157,719 A | 10/1992 | Waldman | |
| 5,274,693 A | 12/1993 | Waldman | |
| 5,402,481 A | 3/1995 | Waldman | |
| 5,467,390 A | 11/1995 | Brankley et al. | |
| 5,742,666 A | 4/1998 | Alpert | |
| 5,963,636 A | 10/1999 | Boakes | |
| 6,285,753 B1 | 9/2001 | Slusher | |
| 7,039,174 B1 | 5/2006 | Chartrand | |
| 2006/0195540 A1 | 8/2006 | Hamilton et al. | |
| 2008/0040771 A1* | 2/2008 | Tang Talpin et al. | ......... 725/136 |

* cited by examiner

*Primary Examiner* — Rasha Al Aubaidi
(74) *Attorney, Agent, or Firm* — Robert M Hunter

(57) ABSTRACT

An apparatus and/or method for routing international telephone calls to a communications device of a particular subscriber in a country and in an area of the country having an area code. A illustrative embodiment is a system for routing an international telephone call from a caller to a specific communications device situated in a country identified by a country calling code and in an area of the country identified by an area code, said system comprising: means for assigning a first telephone number to a particular subscriber; and means for routing the telephone call to the specific communications device of the particular subscriber; wherein the country calling code is a first two-character abbreviation for a country or dependent area; and wherein the area code is a second two-character abbreviation for a state, province, possession or military state.

14 Claims, 4 Drawing Sheets

TELECOMMUNICATIONS SYSTEM WITH IMPROVED COUNTRY CODES AND AREA CODES

CROSS-REFERENCE TO RELATED APPLICATIONS

This application is a continuation in part of U.S. patent application Ser. No. 12/228,717, filed Dec. 7, 2010 which claims the benefit of U.S. Provisional Patent Application No. 60/965,379, filed Aug. 17, 2007, the disclosure of which patent application is incorporated by reference as if fully set forth herein.

STATEMENT REGARDING FEDERALLY SPONSORED RESEARCH OR DEVELOPMENT

Not applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not applicable

BACKGROUND OF THE INVENTION

This invention relates to telecommunication systems and methods. In particular, the invention relates to telecommunication systems and methods that rely on improved country calling codes and area codes.

The present telecommunication systems rely on telephone country calling codes and area codes that are single- or multiple-digit numbers which are assigned in a haphazard manner with no organization of any kind. Moreover, the present country calling codes and area codes do not reveal anything about the area being called. California, for example, has been assigned area codes ranging from a very low 209 to a very high 954.

The ongoing background art is characterized by U.S. Pat. Nos. 3,634,631; 3,870,821; 5,018,191; 5,467,390 and 7,039,174; and U.S. Patent Application No. 2006/0195540; the disclosures of which patents and patent application are incorporated by reference as if fully set forth herein.

BRIEF SUMMARY OF THE INVENTION

As used herein, the following terms and variations thereof have the meanings given below, unless a different meaning is clearly intended by the context in which such term is used:

"A," "an" and "the" and similar referents used herein are to be construed to cover both the singular and the plural unless their usage in context indicates otherwise.

"About" means within ten percent of a recited parameter or measurement, and preferably within twenty percent of such parameter or measurement.

"Comprise" and variations of the term, such as "comprising" and "comprises," are not intended to exclude other additives, components, integers or steps.

A "country code" is a short alphabetic or numeric geographical code (geocode) that represents a country (herein, a State) or a dependent area.

A "dependent area" is a territory that does not possess full political independence or sovereignty as a State, and remains politically outside of the controlling State's integral area.

"Exemplary," "illustrative," and "preferred" mean "another."

A "federated state" (herein, a state) is a territorial and constitutional community forming part of a federal union.

"Line phone" is used in this disclosure to refer to any telephone using standard telephone lines to transmit and receive telephone calls.

The term "wireless phone" is used in this disclosure to refer to any wireless device, including a cellular telephone or other portable telephone.

The purpose of an illustrative embodiment of the invention is to provide an improved telecommunication system that relies on country calling codes and area codes that have meaning. One advantage of an illustrative embodiment of the invention is that country calling codes and area codes would be more memorable.

In an illustrative embodiment, the invention is a system and method for receiving telephone user input and routing international telephone calls. In a telecommunication system that is capable of routing international telephone calls to a communications device of a particular subscriber within an area code of a country having a country calling code, an illustrative embodiment of the invention is a system for routing a telephone call from a caller to said specific communications device, said system comprising: means for assigning a first telephone number to the particular subscriber; and means for routing the telephone call to the specific communications device of the particular subscriber said means for routing being programmed to recognize an area code; wherein said country calling code is a sequence of characters established in accordance with one of the schemes disclosed herein; and wherein said area code is a sequence of characters established in accordance with one of the schemes disclosed herein. A person having ordinary skill in the art will understand that, in some embodiments, background art two-character country codes may be used for two-character country calling codes or that more memorable country codes may be substituted for background art country codes. Similarly, a person having ordinary skill in the art will understand that two-character area codes may be substituted for background art area codes and city calling codes.

In a telecommunication system that is capable of routing international telephone calls to a communications device of a particular subscriber in a country or dependent area and in an area of the country or dependent area, an illustrative embodiment of the invention is a system for routing a telephone call from a caller to said specific communications device, said system comprising: means for assigning a first telephone number to the particular subscriber; and means for routing the telephone call to the specific communications device of the particular subscriber by recognizing an international call prefix, a country calling code and an area code or city code; wherein said country calling code is a first two-character abbreviation for the country or dependent area; and wherein said area code is a second two-character abbreviation for a state, province, possession or military state of that country. In another embodiment of the invention, said international call prefix is a single reverse quote. In another embodiment of the said country calling code is a two-letter code. In another embodiment of the invention, said area code is a two-letter code.

In another illustrative embodiment, the invention is a telecommunication system comprising: a call routing system and a plurality of telephones that are connected to said call routing system; wherein each of said telephones is situated within a country or dependent area having a country calling code and within an area of the country or dependent area having an area code; and wherein said call routing system is operated by a software program that accepts a first two-character abbreviation for the country or dependent area as said country calling code and a second two-character abbreviation for a state, province, possession or military state as said area code.

In another illustrative embodiment, the invention is a telecommunication system comprising: a call routing system; and a plurality of telephones that are connected to said call routing system; wherein each of said telephones comprises a keypad having a dedicated key that when pressed or dialed causes said telephone to send a signal to said call routing system indicating that said call is a long distance call; and wherein said call routing system is operated by a software program that accepts a country calling code that is a first two-character abbreviation for said country or dependent area and an area code that is a second two-character abbreviation for a state or province. In another embodiment, said dedicated key is labeled "L-D."

In yet another illustrative embodiment, the invention is a method of processing an international call, the method comprising: informing a customer of a telecommunication system that is capable of routing calls to a plurality of communications devices of said customer that one of a plurality of unique sets of symbol headings is associated with one type of communications device that is connectable to said telecommunication system; assigning one of a plurality of telephone numbers available within a country having a country calling code and within an area of said country having an area code to said customer of said telecommunication system and granting said customer having a specific communications device that is connected to said telecommunication system the exclusive right to optionally use a combination comprising any one of said unique sets of symbol headings plus said telephone number to identify said specific communications device other than a voice landline device to the other customers of said telecommunication system, said specific communications device being identified as one of said plurality of communications devices of said customer; receiving a sequence of signals representing an international call prefix, said country calling code and said area code plus a specific set of symbol headings plus a specific telephone number that has been dialed by a caller, the combination of the specific set of symbol headings plus said specific telephone number and no other telephone number alone identifying said specific communications device that is the destination for the international call; and connecting the international call to said specific communications device that is the destination for the international call without the need for said telecommunication system to determine the type of communications device to which the international call is directed; wherein said country calling code is a first two-character abbreviation for said country; and wherein said area code is a second two-character abbreviation for a state, province, possession or military state of said country.

In yet another illustrative embodiment, the invention is a system for processing an international call made to a telephone number in a country having a country calling code and in an area of the country having an area code and directed to a specific communications device to which the telephone number is assigned, the system comprising: means for announcing to a customer of a telecommunication system that is capable of routing calls to a plurality of communications devices of the customer that one of a plurality of suggested sets of symbol headings is associated with a single type of communications device that is connectable to a telecommunication system; means for assigning one of a plurality of telephone numbers to the customer of the telecommunication system and granting the customer having a specific communications device the exclusive right to optionally use a combination comprising any one of said suggested sets of symbol headings plus said telephone number to identify the specific communications device to other customers of the telecommunication system, the specific communications device being identified as one of the plurality of communications devices of the customer; a sequence of signals representing a specific set of symbol headings and a specific telephone number that have been dialed by a caller, the sequence of signals being the sole directory number for the specific communications device, the set of symbol headings immediately preceding the telephone number, being distinguishable from said telephone number and together with said telephone number defining a destination for said call; and a routing apparatus having a switching component and an identification component for determining the intended destination of the call and connecting the call to that destination without the need for the telecommunication system to determine the type of communications device to which the call is directed; wherein only one specific communications device of each selected customer has its own telephone number; and wherein no other communications device shares a line with said specific communications device; wherein said country calling code is a first two-character abbreviation for a country or dependent area; and wherein said area code is a second two-character abbreviation for a state, province, possession or military state.

In a further illustrative embodiment, the invention is a routing system for directing international telephone calls to different communications devices having identical voice landline telephone numbers, said system comprising: an administrative subsystem comprising means for informing a customer of a telecommunication system that is capable of routing calls to a plurality of communications devices of the customer that one of a plurality of symbol headings is normally associated with each type of communications device that is connectable to a telecommunication system and means for assigning one of a plurality of telephone numbers to the customer of the telecommunication system and granting said the customer having a specific communications device the exclusive right to optionally use a combination comprising any one of said plurality of symbol headings plus said telephone number to identify the specific communications device to other customers of the telecommunication system, the specific communications device being identified as one of the plurality of communications devices of the customer; a network subsystem having routing apparatus including a switching component and an identification component for processing a call to a destination located in a country or dependent area having a country calling code and in an area of the country or dependent area having an area code, the call including a sequence of signals indicating a particular one of said plurality of symbol headings and a particular telephone number that have been dialed by a caller, the sequence of signals being the sole directory number for the specific communications device; and at least one communications device assigned to a telephone number; wherein said particular one of said plurality of symbol headings does not indicate to said routing apparatus that the specific communications device is a particular type of communications device; wherein only one specific communications device of each selected customer has its own telephone number; wherein no other communications device shares a line with said specific communications device; wherein said country calling code is a first two-character abbreviation for a country or dependent area; and wherein said area code is a second two-character abbreviation for a state, province, possession or military state.

In another illustrative embodiment, the invention is a telecommunication system comprising: a call routing system and a plurality of telephones that are connected to said call routing system; wherein each of said telephones is situated within a country having a country calling code and within an area having an area code; wherein each of said telephones comprises a keypad; and wherein said call routing system is operated by a software program that accepts a subscriber country calling code that is a two-character abbreviation for a country or a dependent area and that accepts a subscriber area code that is a two-character postal state abbreviation.

In another illustrative embodiment, the invention is a telecommunication system comprising: a call routing system and a plurality of telephones that are connected to said call routing system; wherein each of said telephones comprises a keypad having a dedicated key that when pressed or dialed causes said telephone to send a signal to said call routing system indicating that said call is a long distance call; and wherein said call routing system is operated by a software program that accepts a country calling code that is a two-character abbreviation for a country or a dependent area and an area code that is a two-character postal state abbreviation. Preferably, said first dedicated key is labeled "L-D." Thus, with this embodiment, instead of a telephone user dialing the number "1" to indicate a long distance call, a new key labeled "L-D" is provided on the telephone key pad to supply a marker or symbol that replaces the "1" and when pressed or pushed indicates that the call is a long distance call.

In another illustrative embodiment, the invention is a method of processing an international call, the method comprising: informing a customer of a telecommunication system that is capable of routing calls to a plurality of communications devices of said customer that one of a plurality of unique sets of symbol headings is normally, but not always, associated with one type of communications device that is connectable to said telecommunication system; assigning one of a plurality of seven-digit telephone numbers available within a country or dependent area having a country calling code and within an area code of a local area to said customer of said telecommunication system and granting said customer having a specific communications device that is connected to said telecommunication system the exclusive right to optionally use a combination comprising any one of said unique sets of symbol headings plus said seven-digit telephone number to identify said specific communications device other than a voice landline device to the other customers of said telecommunication system, said specific communications device being identified as one of said plurality of communications devices of said customer; receiving a sequence of signals representing said area code plus a specific set of symbol headings plus a specific seven-digit telephone number that has been dialed by a caller, the combination of the specific set of symbol headings plus said specific seven-digit telephone number and no other seven-digit telephone number alone identifying said specific communications device that is the destination for the international call; and connecting said call to said specific communications device that is the destination for the international call without the need for said telecommunication system to determine the type of communications device to which the international call is directed; wherein only one specific communications device of said customer has its own seven-digit telephone number; wherein no other communications device shares a line with said voice landline device; wherein said country calling code is a two-character abbreviation for said country or dependent area; and wherein said area code is a two-character postal state abbreviation.

In yet another illustrative embodiment, the invention is a system for processing an international call made to a telephone number and directed to a specific communications device to which that telephone number is assigned, the system comprising: means for announcing to a customer of a telecommunication system that is capable of routing calls to a plurality of communications devices of the customer that one of a plurality of suggested sets of symbol headings is normally associated with a single type of communications device that is connectable to a telecommunication system; means for assigning one of a plurality of telephone numbers to the customer of the telecommunication system and granting the customer having a specific communications device the exclusive right to optionally use a combination comprising any one of said suggested sets of symbol headings plus said telephone number to identify the specific communications device to other customers of the telecommunication system, the specific communications device being identified as one of the plurality of communications devices of the customer; a sequence of signals representing a specific set of symbol headings and a specific telephone number that have been dialed by a caller, the sequence of signals being the sole directory number for the specific communications device, the set of symbol headings immediately preceding the telephone number, being distinguishable from said telephone number and together with said telephone number defining a destination for said call; and a routing apparatus having a switching component and an identification component for determining the intended destination of the call and connecting the call to that destination without the need for the telecommunication system to determine the type of communications device to which the call is directed; wherein only one specific communications device of each selected customer has its own seven-digit telephone number; wherein no other communications device shares a line with said specific communications device; wherein said country calling code is a two-character abbreviation for a country or a dependent area; and wherein said area code is a two-character abbreviation of a state or province.

In a further illustrative embodiment, the invention is a routing system for directing international calls to different communications devices having identical (e.g., seven-digit) voice landline telephone numbers, said system comprising: an administrative subsystem comprising means for informing a customer of a telecommunication system that is capable of routing calls to a plurality of communications devices of the customer that one of a plurality of symbol headings is normally associated with each type of communications device that is connectable to a telecommunication system and means for assigning one of a plurality of telephone numbers to the customer of the telecommunication system and granting said the customer having a specific communications device the exclusive right to optionally use a combination comprising any one of said plurality of symbol headings plus said telephone number to identify the specific communications device to other customers of the telecommunication system, the specific communications device being identified as one of the plurality of communications devices of the customer; a network subsystem having routing apparatus including a switching component and an identification component for processing an international call to a destination, the international call including a sequence of signals indicating a country calling code, an area code and a particular one of said plurality of symbol headings and a particular telephone number that have been dialed by a caller, the sequence of signals being the sole directory number for the specific communications device; and at least one communications device assigned to a telephone number; wherein said particular one of said plurality of symbol headings does not indicate to said routing apparatus that the specific communications device is a particular type of communications device; wherein only one specific communications device of each selected customer has its own (e.g., seven-digit) telephone number; wherein no other communications device shares a line with said specific communications device; and wherein said country calling code is a two-character abbreviation for a country or a dependent area and said area code is a two-character state or province abbreviation.

In another illustrative embodiment, in a telecommunication system that is capable of routing international telephone calls to a plurality of communications devices of a subscriber that is one of a plurality of subscribers within a country having a country calling code and within an area code, the invention is a method for routing a telephone call to a specific communications device of the subscriber, said method for routing comprising: assigning a multi-digit (e.g., seven-digit) telephone number to the subscriber; accepting the seven-digit telephone number alone as an indication that a caller desires to reach the specific communications device of the subscriber, said specific communications device being a first voice landline device, the specific communications device being indicated as one of the plurality of communications devices of the subscriber; accepting an 8-part or 9-part telephone number comprising a heading and the seven-digit telephone number as an indication that the caller desires to reach another specific communications device of the subscriber, said other specific communications device being reachable by the caller's dialing no other seven-digit telephone number, the other specific communications device being indicated as another one of the plurality of communications devices of the subscriber; and routing said telephone call to the specific communications device of the subscriber; wherein said heading does not indicate to said system that the call is a particular type of communication; wherein said caller has the option of using as the heading a # for a facsimile device or a second landline voice device, a * for a first cellular device, or a 2*, a 3*, a 4*, a 5*, a 6*, a 7*, a 8*, or a 9* for another cellular device; and wherein each other specific communications device does not have its own seven-digit telephone number; wherein no other communications device shares a line with said first voice landline device; wherein said country calling code is a two-character abbreviation for a country or a dependent area; and wherein said area code is a two-character state or province abbreviation.

In a telecommunication system that is capable of routing telephone calls to a plurality of communications devices of a particular subscriber, another illustrative embodiment of the invention is a system for routing an international telephone call from a caller to a specific communications device of the particular subscriber within a country or dependent area having a country calling code and an area code for a local area, said system comprising: means for assigning a first telephone number to the landline telephone of the particular subscriber, a second telephone number to a facsimile machine or second landline telephone of the particular subscriber and a third telephone number to a cellular telephone of the particular subscriber, each of the landline telephone, the facsimile or second landline telephone and the cellular telephone being one of the plurality of communications devices of the particular subscriber; and means for routing the international telephone call to the specific communications device of the particular subscriber without the need for the telecommunication system to determine the type of communications device to which the telephone call is directed; wherein only one specific communications device of the particular subscriber has its own seven-digit telephone number; wherein all of said telephone numbers comprise the exact same seven numerical digits and no other numerical digits, said second telephone number further comprises a # heading digit, and said third telephone number comprise a * heading digit; wherein each specific communications device of the particular subscriber is reachable by the caller's dialing no other seven-digit telephone number; wherein no other communications device shares a line with said first landline telephone; wherein said country calling code is or a two-character abbreviation for said country or a dependent area; and wherein said area code is a two-character abbreviation for said local area.

Further aspects of the invention will become apparent from consideration of the drawings and the ensuing description of illustrative embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE DRAWING

The features of the invention will be better understood by reference to the accompanying drawing which illustrates presently illustrative embodiments of the invention. In the drawing.

Figure 1:
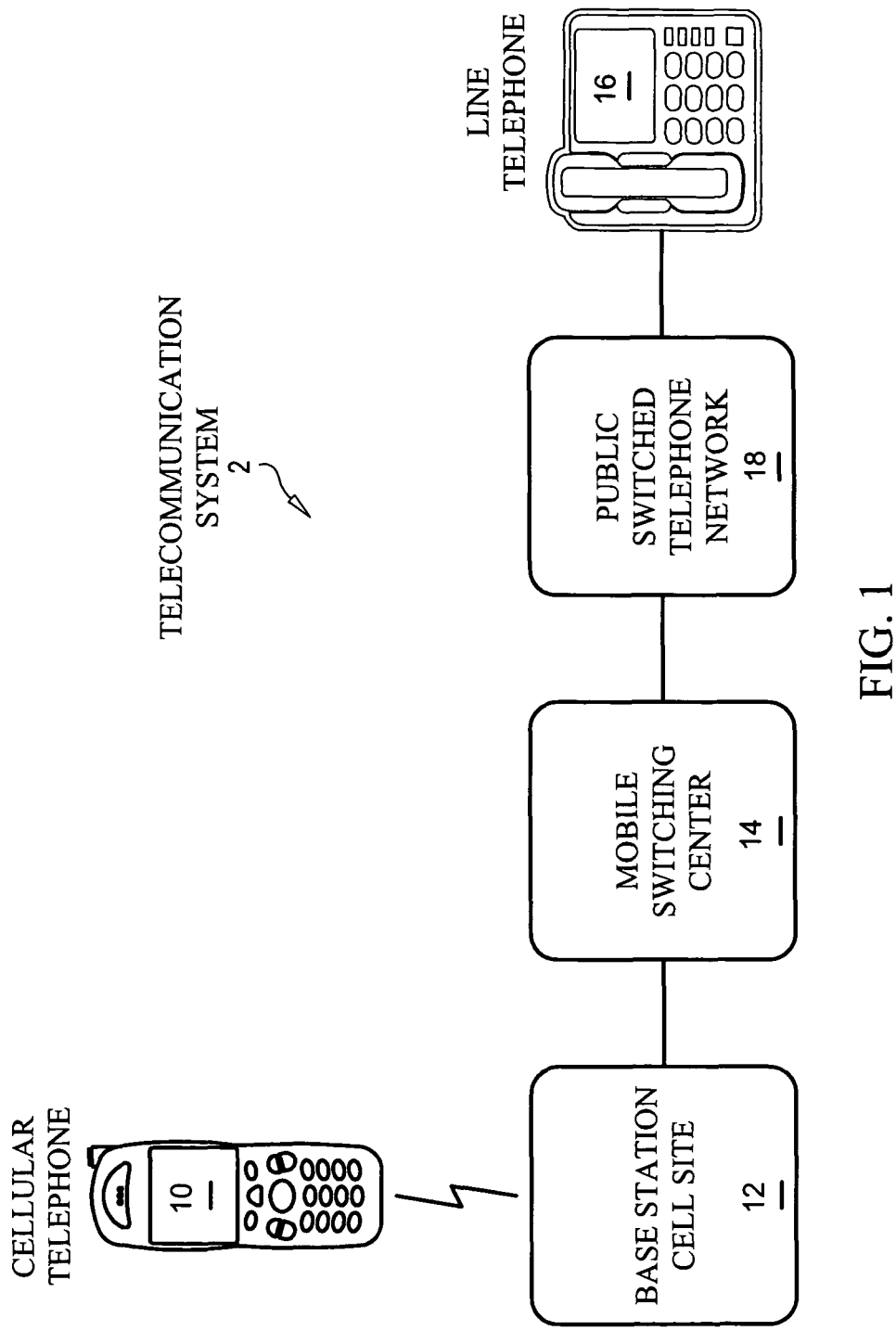
FIG. 1 is a block diagram of a telecommunication system in accordance with an illustrative embodiment of the invention.

The following reference numerals are used to indicate the parts and environment of the invention on the drawings:
2 telecommunication system
10 cellular telephone
12 base station, cell site
14 mobile switching center
16 line telephone
18 public switched telephone network
10 wireless phone
12 base station
14 mobile switching center
16 line telephone
18 public switched telephone network
20 another mobile switching center
22 additional public switched telephone network
24 intended wireless phone, destination wireless phone
28 transceiver
30 transmitter
32 receiver
34 scanning receiver
36 system controller
38 communications controllers
40 switching assembly
42 operator terminals 44 subscriber database registers
46 signal processor
48 central processing unit
50 switching processor
52 switching matrix
110 first block
112 second block
114 third block
116 fourth block
118 fifth block
120 sixth block
122 seventh block
124 eighth block
128 ninth block
130 tenth block

DETAILED DESCRIPTION OF THE INVENTION

Referring to FIG. 1, an illustrative embodiment of telecommunication system 2 is presented. In this embodiment, telecommunication system 2 comprises cellular telephone 10, base station or cell site 12, mobile switching center 14, line telephone 16 and public switched telephone network 18. A detailed disclosure of an illustrative embodiment of a telecommunication system is presented in U.S. Pat. No. 7,039,174; the disclosure of which patent is incorporated by reference as if fully set forth herein.

Figure 2:
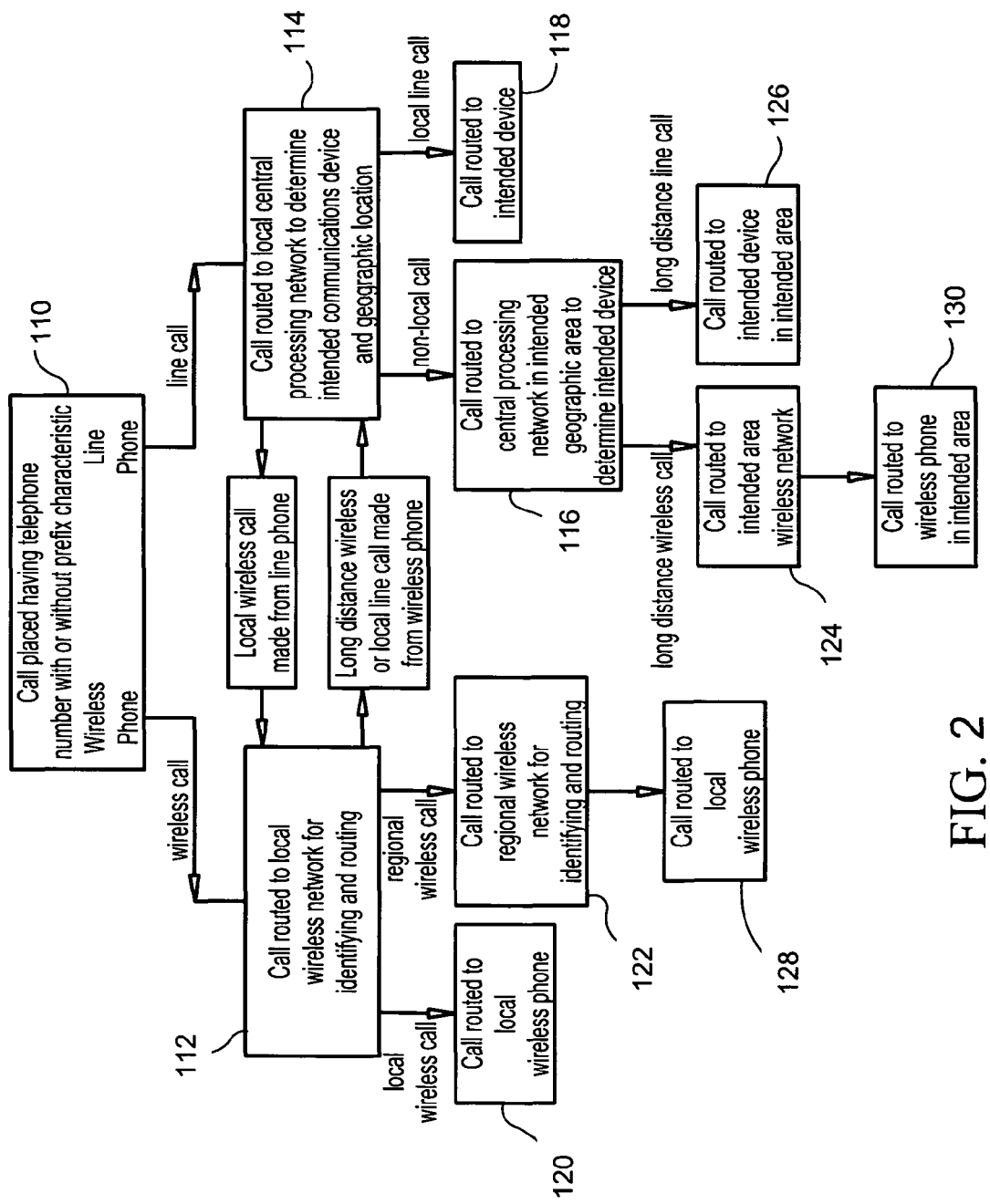
FIG. 2 is a block diagram flowchart of the overall operation of a system implementing an illustrative embodiment of the present invention.

Referring to FIG. 2, a block diagram flowchart of the overall operation of a system implementing an illustrative embodiment of the present invention is presented. In first block 110, a call is placed, such as for example from a wireless or cellular phone, facsimile machine or line phone. In an illustrative embodiment of the present invention, the call is placed by dialing a set of prefix characteristics plus a telephone number. The telephone number is preferably preceded (but may be followed) by the set of prefix characteristics that together indicate a destination for each call. Each destination is a specific, intended communications device. A specific communications device may be a cellular or wireless telephone, a line telephone, a facsimile machine, a pager, or any other device now known or developed in the future which may be capable of receiving a call over a public telephone network. This specification intends that the terms wireless and cellular can be used interchangeably to refer to any telephone which communicates by transmitting and receiving signal using radio waves or other wireless forms of communication.

In one embodiment, the initial prefix characteristic is a C (or 2) for cellular or an F (or 3) for facsimile, followed by the telephone number. In another embodiment, a double-digit prefix is entered prior to the telephone number. For example, a caller can dial 1# (or 4#) for Internet, P# (or 7#) for pager, S# (or 7#) for satellite, and W# (or 9#) for wireless. In yet another embodiment, the two-digit prefix can include two non-numeral characters, such as for example ** or #*.

Telephone keypads may also be modified to allow additional symbols to appear on the keypad. Each touch-tone digit is a unique combination of two single-frequency tones. The frequencies are arranged in a matrix. As the button is pushed for a specific digit, the appropriate combination of two tones is generated, corresponding to the intersection of the vertical and horizontal axes. The frequencies corresponding to the horizontal axis are called low band and are 697 Hz, 770 Hz, 852 Hz, and 941 Hz. The frequencies corresponding to the vertical axis are called high band and are 1209 Hz, 1336 Hz, 1477 Hz, and 1633 Hz. When a button is pushed, two tones at the frequencies corresponding to the intersection of the vertical and horizontal axes are produced. A central processing network or mobile switching center senses the frequencies of the tones and determines the dialed digit. For example, if the digit 8 were pushed, two frequencies would be generated simultaneously and filtered and detected to determine the dialed digit.

However, there are four frequencies for the vertical axis and only three columns of digits on stands rd telephone keypads. Therefore, there are four available buttons on every keypad that are not used or provided for. Accordingly, four more symbols may be placed on each keypad. In the present invention, these symbols could be used as prefix characteristics to indicate an intended communications device. For example, Greek letters may be used as buttons on a keypad, such as .phi., .lamda., .pi. or .psi. These could therefore be used to create set of prefix characteristics where .phi. represents a wireless phone, .lamda. represents a facsimile machine, .pi. represents a pager, and .psi. represents a line phone.

Each keypad digit is also expressed as a so-called BCD (binary coded decimal) four-bit code. The * is equivalent to a binary 1011, which is a decimal eleven (11), and the # is equivalent to a binary 1100, which is a decimal twelve (12). Also available are three unused BCD (binary coded decimal) four-bit codes that represent each digit. These are binary 1010 (ten), 1101 (thirteen), and 1110 (fourteen). Another row of three or more new symbols may be provided on new phones or with an inline attachment on present phones. Each symbol may designate a specific function like fax, wireless, Internet, pager, etc. and may be utilized in the same manner as the * for wireless that was previously described.

Second block 112 of FIG. 2 shows one procession of a call made from a wireless phone. If the call placed in first block 110 is made using a cellular telephone, the call is routed through a local network for processing. Current wireless networks include a base station, or cell site, and a mobile switching center.

Wireless phone refers to any cellular or portable telephone that transmits on radio waves to a nearby wireless network and then over a standard telephone network to a line telephone or to a cellular tower and back to a nearby cellular or other portable telephone. This includes wireless telephones that transmit and receive on high frequency bands, as well as cellular systems that transmit via community radar sites or a satellite or other means instead of a local cellular tower.

An illustrative embodiment of the system and method of the present invention is compatible with the existing wireless infrastructure. Each wireless telephone has a 10-digit number called a Mobile Identification Number (MIN). To receive calls, the telephone searches for its MIN on a paging channel, and to transmit calls, the telephone transmits its MIN. The present invention can be integrated into the current wireless system in several ways. For example, the 10-digit MIN can be extended one or more digits. For incoming wireless calls using a one-digit set of prefix characteristics, the present 10-digit MIN can be used, with the mobile switching center ignoring the set of prefix characteristics and completing the call by paging with the present 10-digit MIN. In this example, the operation of the wireless system proceeds as normal. However, for incoming calls with the 2 or more digit set of prefix characteristics, one digit may be added to the MIN, or in the alternative, a two-step paging process may use the 10-digit MIN. This update may be required only on wireless phones that feature multiple customers sharing numbers one digit apart. In another example, for calls routed through the Public Switches Telephone Network (PSTN), the same switching presently used by the PSTN to route the 10-digit wireless telephone number is utilized. In a further example, for the 11-digit version of the single-digit set of prefix characteristics, the routing may be processed by tone signaling, which is presently used for control and status indications. The unique tone of a key, for example the * key, which is made by combining the frequencies of 941 Hz and 1209 Hz, acts as a call signal denoting a wireless number.

Calls passing through the wireless network that are determined to be long distance, i.e., to an area code outside of the regional location of the caller, are routed to a central processing network in third block 114 and then to a central processing network in the geographical area where the destination of call is located, as shown in fourth block 116. Here, a signal processor and central processing unit determine whether the call is intended for a specific wireless phone, or another destination. If the call is intended for a wireless phone, the call is then routed to the wireless network in the same geographical area, the wireless network including the base station and the mobile switching center. This is shown in eighth block 124. At this point, because of the prefix characteristic dialed preceding the telephone number, it has been determined that the intended communications device is a particular wireless telephone. Accordingly, the call is then routed to the appropriate wireless phone. This is shown in tenth block 130. If the call if intended for a line phone, the call is routed to the specific communications device as shown in ninth block 128.

Calls passing through the wireless network that are determined to be intended for other wireless phones proceed through the base station and mobile switching center. Calls that are intended for local wireless phones are routed to the intended wireless phone as shown in sixth block 120. Calls that are intended for out of the region are routed to another wireless network in the appropriate region as shown in seventh block 122 and then routed to the intended wireless phone in ninth block 128.

Calls may be placed from a wireless phone and intended for another wireless phone without the need for a set of prefix characteristics, as long as the intended telephone number has no other communications devices assigned to it, or as long as the intended telephone number has the a wireless phone as a default device.

If the call placed in first block 110 is made from a line telephone using customary telephone lines, the call proceeds to the local central processing network as shown in third block 114. If the call is intended for a geographic area outside of the local calling area, it is routed to a central processing network in the intended area as shown in fourth block 116. In this embodiment, the central processing network is a Public Switched Telephone Network (PSTN) typically used in the telecommunications field for managing telephone call volume. If it is a local call, the ventral processing network performs call identification and routing functions. The central processing network includes a signal processor and a switching matrix to identify and route calls. The signal processor includes a microprocessor that receives a signal containing the call through an input. The signal processor reads the prefix characteristics at the beginning of the call to determine the intended communications device. Software at the signal processor determines the intended destination and outputs the call to a switch processor and then to the switching matrix, which routes the call to the appropriate location. This location may be either a specific communications device or another central processing network. The central processing network then routes the call to the intended communications device as shown in fifth block 118.

Figure 3:
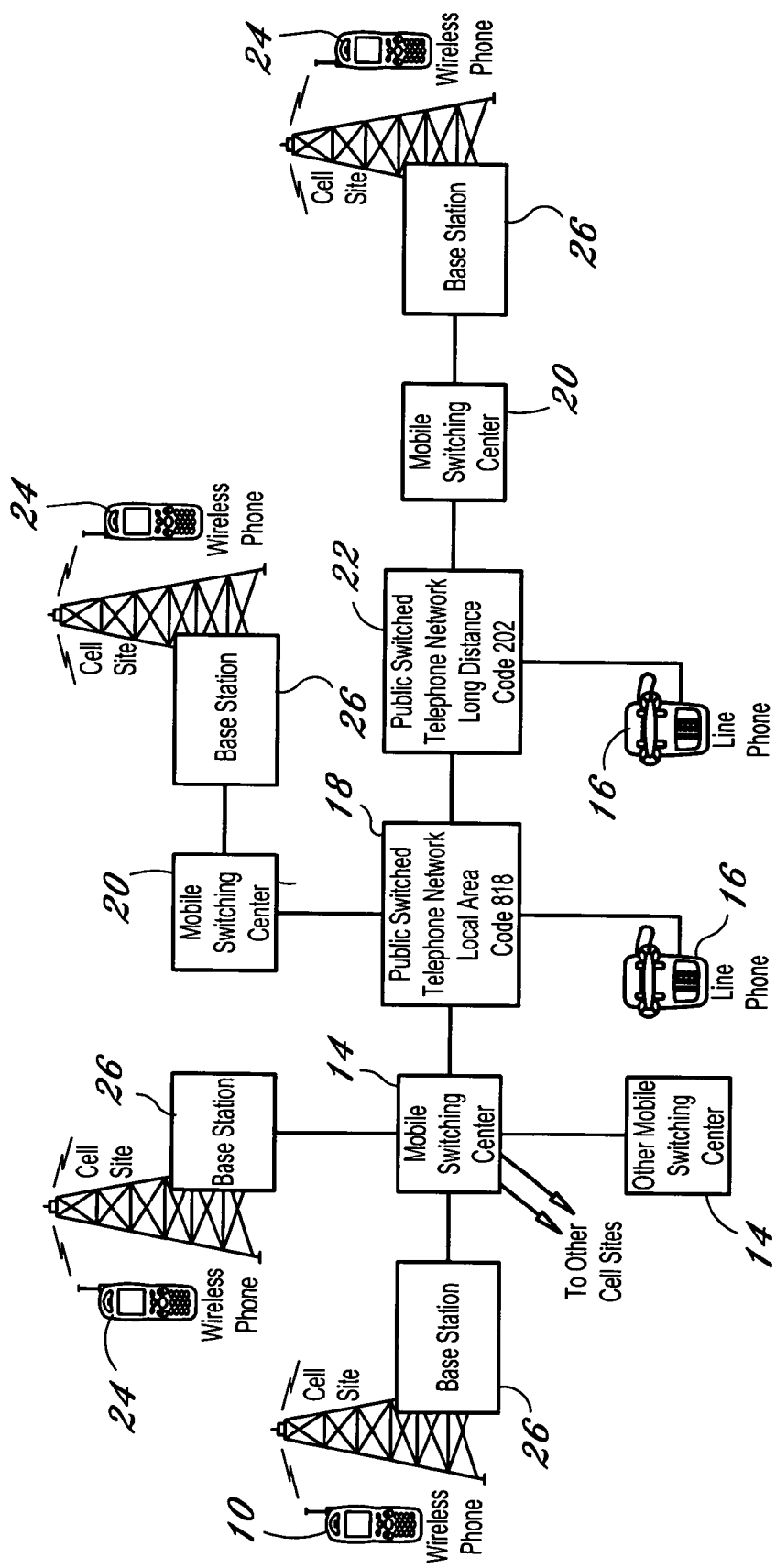
FIG. 3 is an overall schematic view of the system of the present invention, showing the components of a network implementing an illustrative embodiment of the present invention.

Referring to FIG. 3, a schematic block diagram of a telecommunications network incorporating an illustrative embodiment of the present invention is presented. Telephone calls placed from a wireless phone 10 travel over a wireless connection to a base station 12. The call is transferred to a mobile switching center (MSC) 14. If the call is intended for another wireless phone, it is either directly routed to the intended wireless phone 24, or it is routed to another mobile switching center 14 and their on to the intended wireless phone.

Wireless phone 10 communicates by radio signals directly or via satellite with a base station 12 within its area. The base station 12 converts incoming audio from the MSC 14 into RF (radio frequency) for transmitting to the wireless phone 10 and converts outgoing radio signals from the wireless phone 10 for transfer to the MSC 14 via a land line or microwave link. If the call is intended for another wireless phone 24, the MSC 14 routes the call to the destination wireless phone 24.

If the call is intended for another specific communications device, such as line telephone 16, or for a wireless phone in a different regional location, MSC 14 routes the call to a Public Switched Telephone Network (PSTN) 18 in the call area in which the original call is made. The PSTN 18 processes the call and determines whether it is intended for a locally-based device or a device in another geographical location. If intended for a locally-based device, it is either routed to the appropriate device in the case of non-wireless calls, or to an additional mobile switching center (MSC) 20 for processing if the call is intended for a wireless telephone 24. If the call is intended for a device, wireless or otherwise, in another geographic location, the call is routed to an additional PSTN 22. The additional PSTN 22 repeats the previous process, routing the call to a locally-based device, an MSC 20, or another PSTN 22 until the call reaches its intended destination.

Figure 4:
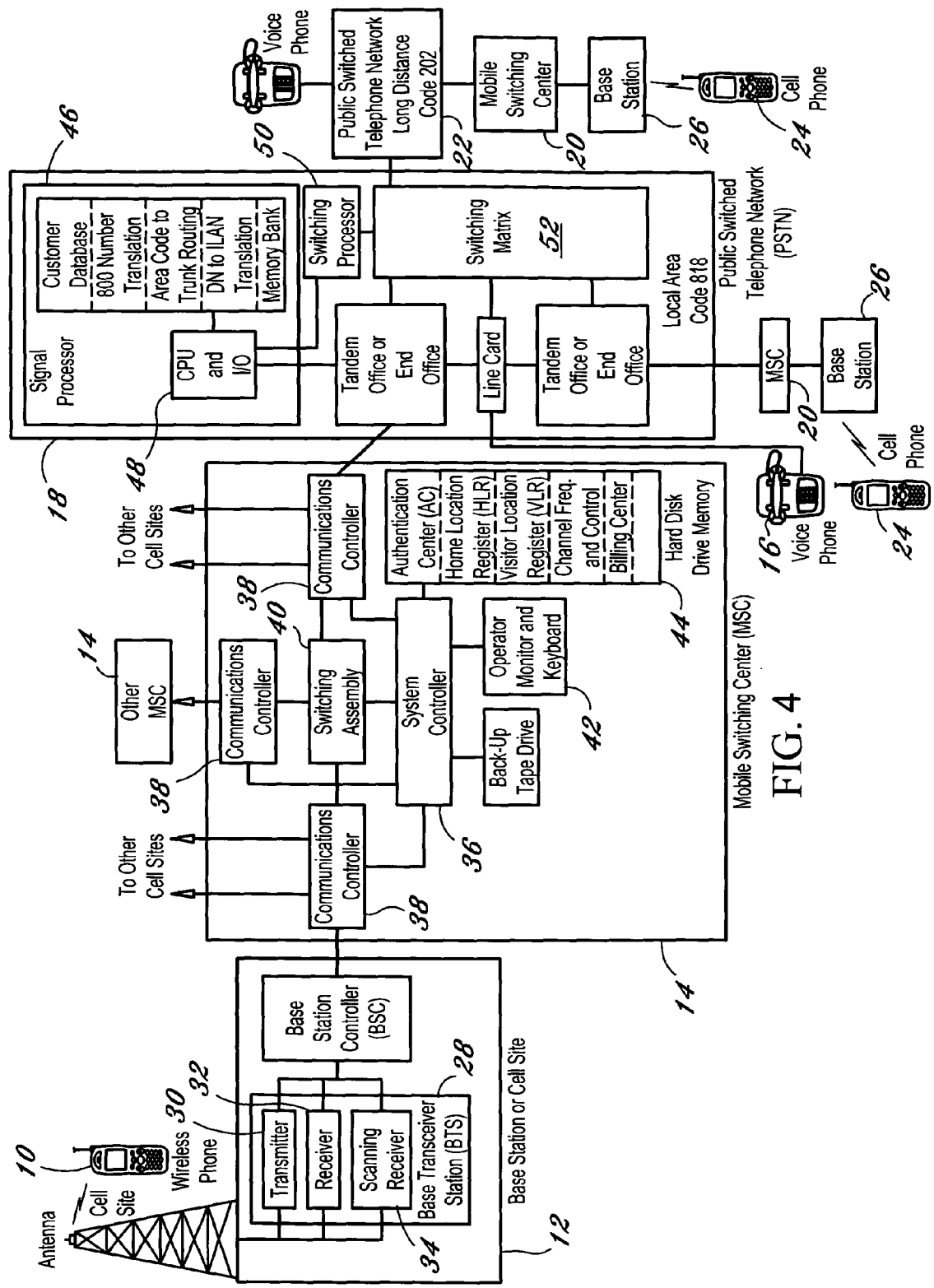
FIG. 4 is a detailed view of the schematic components of FIG. 3, showing internal components of each major part of a network implementing an illustrative embodiment of the present invention.

Referring to FIG. 4, a detailed view of the components of the illustrative system of FIG. 2 is presented. The baseband voice signal (analog or digital) of the wireless phone 10 is converted into RF signals for communication between the base station 12 and the wireless phone 10. This is accomplished at the base station 12, which includes a transceiver 28 having a transmitter 30, a receiver 32, and a scanning receiver 34.

Base station 12 also includes system controller 36 that coordinates the operation of all base station equipment based on commands received from MSC 14. The functions of system controller 36 include control signal routing and message processing. System controller 36 inserts control channel signaling messages, sets up voice channels, and operates the radio location/scanning receiver. In addition, system controller 36 monitors equipment status and reports operational and failure status to the MSC 14.

In this embodiment, MSC 14 coordinates all communication channels and processes. MSC 14 processes requests for service from wireless phones and land line callers, and routes calls between the base station 12 and the PSTN 18. The MSC 14 receives the dialed digits, creates and interprets call processing tones, and routes the call paths.

In this embodiment, the MSC's main components are system controller 36, communication controllers 38, switching assembly 40, operator terminals 42, and subscriber database registers 44. System controller 36 guides MSC 14 by coordinating the base stations, MSC switching functions, and PSTN connections. System controller 36 creates and interprets commands between MSC 14 and the base stations, controls the MSC switch, validates customers requesting access, maintains air time and PSTN billing records, and monitors for equipment failures. Communications controllers 38 process and buffer voice and data information between the MSC, base stations and PSTN. They combine voice paths with high-speed data and, in reverse, separate voice paths from high-speed data.

Switching assembly 40 connects base stations and the PSTN 18 with either a physical connection (analog) or a logic path (digital). Analog switches require a physical connection between switch paths. Current digital wireless switches use digital communication links. The switching assembly 40 is a high speed matrix memory storage and retrieval system that provides virtual connections between the base station voice channels and the PSTN voice channels. Operator terminals 42 control maintenance and administrative functions. Operator terminal 42 may be a computer monitor and keyboard dedicated to controlling equipment and modifying the subscriber database registers.

System controller 36 processes various subscriber database registers 44, such as Authentication Center (AC), Home Location Register (HLR), Visitor Location Register (VLR), and Billing Center. The Authentication Center (AC) stores and processes information required to authenticate a wireless phone. During authentication, the AC processes information from the wireless phone and compares it to previously stored information. If the processed information matches, the wireless phone passes.

The Home Location Register (HLR) is a subscriber database register 44 containing each customer's Mobile Identification Number (MIN), which is the 10-digit phone number, and 11-digit Electronic Serial Number (ESN) of the wireless phone to uniquely identify each customer. Each wireless phone is created with a unique eleven-digit electronic serial number (ESN). The first three digits represent the manufacturer, and the last eight are a serial number. The combined MIN and ESN uniquely identify a valid subscriber. Each customer's user profile includes the selected long distance carrier, calling restrictions, service fee charge rates, and other selected network options. The subscriber can change and store the changes for some feature options in the HLR-(such as call forwarding). System controller 36 uses this information to authorize system access and process individual call billing.

The HLR register is a set of bits of high-speed memory within a central processing unit. Instructions fetch the data to the register from a database in a magnetic hard disk memory. The subscriber database registers 44 are critical, so they are regularly backed up, typically on tape, to restore the information if the HLR system fails.

The Visitor Location Register (VLR) contains a subset of a subscriber's HLR information for use while roaming. The VLR eliminates the need for the visited MSC to continually check with the visitor's HLR each time access is attempted. The visitor's information is temporarily stored in the VLR memory, and then erased either when the wireless phone registers in another system or after a specified period of inactivity.

Base station 12 may command the wireless phone 10 to respond to commands (system orders) independent of the user's knowledge. This includes system registration commands. When the wireless phone receives an order, it will setup its response message (a flag) to indicate that it will access the system as a response to a system order.

The background art system of sending line calls from a wireless phone 10 is not affected by illustrative embodiments of the present invention. The originating wireless phone 10 dials the multi-digit (e.g., 7-digit or the 10-digit) line number and the call is routed by the MSC 14 to the nearby PSTN 18 to the line phone 16 or through several PSTNs to a long distance line phone 16. Illustrative embodiments of the present invention also have no effect on line phone to line phone calls. All originating multi-digit calls from a line phone to another line phone would be routed in the present manner through the PSTNs.

When the call reaches the PSTN 18 in FIG. 4, the set of prefix characteristics and telephone number are processed by a signal processor 46 which determines the communications service to which the call is intended. The call enters central processing unit 48 in the signal processor 46. The signal processor may include a memory unit having database registers, such as a customer database, an 800 number translation register an area code routing register, and a DN-to-ILAN translation register. This register includes tables that translate Direct Number signals to Internal Line Appearance Number signals for processing telephone calls.

After a call having a set of prefix characteristics and a telephone number is processed by central processing unit 48 and signal processor 46, the call is sent through the central processing unit output port to a switching processor 50 and then to the switching matrix 52 after the call's destination is determined. Switching matrix 52 then routes the call to the particular component of the PSTN 18 that will transmit the call to the intended destination. For example, if the set of prefix characteristics plus the telephone number indicates that the call is intended for a local line telephone, the switching matrix 52 routes the call through a line connection to the intended device. If the set of prefix characteristics plus the telephone number indicates that the call is intended for a local wireless phone, switching matrix 52 routes the call to an MSC in the local area, which in turn identifies the intended destination and routes the call appropriately. If the set of prefix characteristics plus the telephone number indicates that another specific communications device is intended, such as a pager, switching matrix 52 also routes the call accordingly. Furthermore, if the set of prefix characteristics plus the telephone number indicates that the call is intended for a specific communications device, wireless or otherwise, in another geographic location, switching matrix 52 routes the call to another PSTN 22, where a signal processor having a central processing unit identifies the communications device intended using the set of prefix characteristics plus the telephone number and instructs the switching matrix 52 to route the call accordingly. (Note: The above discussion is written from the user's viewpoint. In illustrative embodiments of the invention, the set of prefix characteristics is actually part of the assignable telephone number. The term "plus the telephone number" refers only to that portion of the assignable telephone number containing a plurality (e.g., seven) numerical digits.)

It is to be understood that other embodiments may be utilized and structural and functional changes may be made without departing from the scope of the present invention. The foregoing description of the embodiments of the invention has been presented for the purposes of illustration and description. It is not intended to be exhaustive or to limit the invention to the precise form disclosed. Accordingly, many modifications and variations are possible in light of the above teaching. For example, the set of prefix characteristics may be a set of suffix characteristics dialed at the conclusion of a telephone number. In another example, the set of prefix characteristics dialed to indicate a particular communications device may include symbols not currently included on telephones but which are possible in light of the frequencies associated with the telephone keypads. It is therefore intended that the scope of the invention be limited not by this detailed description, but rather by the claims appended hereto.

In an illustrative embodiment of the invention, telecommunication system 2 relies on an improved country calling code and an improved area code scheme. In one embodiment, telecommunication system 2 relies on country calling codes that indicate which State or dependent area is encompassed by each country calling code and area codes that indicate which state or province is encompassed by each area code.

In an illustrative embodiment, each two-character country calling code is equivalent to a two-letter abbreviation of one of the 240 top countries with telephone calling codes. In one embodiment, all international long distance calls would be initiated by dialing a symbol, such as a reverse single quote, prior to dialing the country calling code, instead of dialing a background art international call prefix, e.g., 011. In this embodiment, the country calling code is followed by an area code or a city code and then by a telephone number. In an alternative embodiment, calling a telephone in one of the thirteen Caribbean countries does not involve dialing an area code or a city code. In that embodiment, the country calling codes for those countries are AN, BS, BB, BM, CI, DR, GD, JM, PR, LU, VC, TT, and VI, as indicated on the list below.

The country calling codes may be stored in a memory of telecommunication system 2 in alphabetical order, as follows, by country name, for example:

| Present country calling code | Country | Invention country calling code |
|---|---|---|
| 93 | Afghanistan | AF |
| 355 | Albania | AL |
| 213 | Algeria | AG |
| 684 | American Samoa | AS |
| 376 | Andorra | AD |
| 244 | Angola | AO |
| 809 | Anguilla | AI |
| 268 | Antigua | AN |
| 54 | Argentina | AR |
| 374 | Armenia | AM |
| 297 | Aruba | AA |
| 247 | Ascension Island | AC |
| 61 | Australia | AU |
| 672 | Australian External Territories | AE |
| 43 | Austria | AT |
| 994 | Azerbaijan | AZ |
| 242 | Bahamas | BS |
| 246 | Barbados | BB |
| 973 | Bahrain | BH |
| 880 | Bangladesh | BD |
| 375 | Belarus | BL |
| 32 | Belgium | BE |
| 501 | Belize | BZ |
| 229 | Benin | BN |
| 809 | Bermuda | BM |
| 975 | Bhutan | BT |
| 284 | British Virgin Islands | BG |
| 591 | Bolivia | BO |
| 387 | Bosnia and Hercegovina | BA |
| 267 | Botswana | BW |
| 55 | Brazil | BR |
| 673 | Brunei Darussalm | BU |
| 359 | Bulgaria | BG |
| 226 | Burkina Faso | BF |
| 257 | Burundi | BI |
| 855 | Cambodia | CB |
| 237 | Cameroon | CM |
| 1 | Canada | CA |
| 238 | CapeVerde Islands | CV |
| 345 | Cayman Islands | CI |
| 238 | Cape Verdi | CV |
| 236 | Central African Republic | CF |
| 235 | Chad | CD |
| 56 | Chile | CH |

-continued

| Present country calling code | Country | Invention country calling code |
|---|---|---|
| 86 | China (People's Republic) | CN |
| 886 | China-Taiwan | TW |
| 57 | Colombia | CO |
| 269 | Comoros and Mayotte | CS |
| 242 | Congo | CG |
| 682 | Cook Islands | CK |
| 506 | Costa Rica | CR |
| 385 | Croatia | CT or HR |
| 53 | Cuba | CU |
| 357 | Cyprus | CY |
| 420 | Czech Republic | CZ |
| 45 | Denmark | DK |
| 246 | Diego Garcia | DG |
| 767 | Dominca | DO |
| 809 | Dominican Republic | DR |
| 253 | Djibouti | DJ |
| 593 | Ecuador | EC |
| 20 | Egypt | EG |
| 503 | El Salvador | ES |
| 240 | Equatorial Guinea | EQ |
| 291 | Eritrea | ER |
| 372 | Estonia | EN |
| 251 | Ethiopia | ET |
| 500 | Falkland Islands | FK |
| 298 | Faroe (Faeroe) Islands (Denmark) | FO |
| 679 | Fiji | FJ |
| 358 | Finland | FI |
| 33 | France | FR |
| 596 | French Antilles | FA |
| 594 | French Guiana | FG |
| 241 | Gabon (Gabonese Republic) | GB |
| 220 | Gambia | GA |
| 995 | Georgia | GG |
| 49 | Germany | GM |
| 233 | Ghana | GH |
| 350 | Gibraltar | GI |
| 30 | Greece | GR |
| 299 | Greenland | GL |
| 473 | Grenada/Carricou | GD |
| 784 | Grenadines | GD |
| 671 | Guam | GU |
| 502 | Guatemala | GT |
| 224 | Guinea | GN |
| 245 | Guinea-Bissau | GS |
| 592 | Guyana | GY |
| 509 | Haiti | HT |
| 504 | Honduras | HO |
| 852 | Hong Kong | HK |
| 36 | Hungary | HU |
| 354 | Iceland | IC |
| 91 | India | IN |
| 62 | Indonesia | ID |
| 98 | Iran | IR |
| 964 | Iraq | IQ |
| 353 | Ireland (Irish Republic; Eire) | IL |
| 972 | Israel | IS |
| 39 | Italy | IT |
| 225 | Ivory Coast (La Cote d'Ivoire) | IV |
| 876 | Jamaica | JM |
| 81 | Japan | JP |
| 962 | Jordan | JO |
| 7 | Kazakhstan | KZ |
| 254 | Kenya | KE |
| 855 | Khmer Republic (Cambodia/Kampuchea) | KR |
| 686 | Kiribati Republic (Gilbert Islands) | KI |
| 82 | Korea, Republic of (South Korea) | KS |
| 850 | Korea, People's Republic of (North Korea) | KN |
| 965 | Kuwait | KU |
| 996 | Kyrgyz Republic | KG |
| 371 | Latvia | LV |
| 856 | Laos | LA |
| 961 | Lebanon | LB |
| 266 | Lesotho | LO |
| 231 | Liberia | LI |
| 370 | Lithuania | LT |

-continued

| Present country calling code | Country | Invention country calling code |
|---|---|---|
| 218 | Libya | LY |
| 423 | Liechtenstein | LS |
| 352 | Luxembourg | LX |
| 853 | Macao | MC |
| 389 | Macedonia | MA |
| 261 | Madagascar | MD |
| 265 | Malawi | MW |
| 60 | Malaysia | MY |
| 960 | Maldives | MI |
| 223 | Mali | ML |
| 356 | Malta | MT |
| 692 | Marshall Islands | MH |
| 596 | Martinique (French Antilles) | MQ |
| 222 | Mauritania | MR |
| 230 | Mauritius | MU |
| 269 | Mayotte | ME |
| 52 | Mexico | MX |
| 691 | Micronesia (F.S. of Polynesia) | FM |
| 373 | Moldova | MV |
| 33 | Monaco | MN |
| 976 | Mongolia | MG |
| 473 | Montserrat | MS |
| 212 | Morocco | MO |
| 258 | Mozambique | MZ |
| 95 | Myanmar (former Burma) | MM |
| 264 | Namibia (former South-West Africa) | NM |
| 674 | Nauru | NR |
| 977 | Nepal | NP |
| 31 | Netherlands | NL |
| 599 | Netherlands Antilles | NA |
| 869 | Nevis | NV |
| 687 | New Caledonia | NC |
| 64 | New Zealand | NZ |
| 505 | Nicaragua | NU |
| 227 | Niger | NI |
| 234 | Nigeria | NG |
| 683 | Niue | NE |
| 850 | North Korea | NK |
| 1 670 | North Mariana Islands (Saipan) | MI |
| 47 | Norway | NO |
| 968 | Oman | OM |
| 92 | Pakistan | PK |
| 680 | Palau | PU |
| 507 | Panama | PM |
| 675 | Papua New Guinea | PG |
| 595 | Paraguay | PY |
| 51 | Peru | PE |
| 63 | Philippines | PH |
| 48 | Poland | PL |
| 351 | Portugal (includes Azores) | PO |
| 787/939 | Puerto Rico | PR |
| 974 | Qatar | QA |
| 262 | Reunion (France) | RE |
| 40 | Romania | RO |
| 7 | Russia | RU |
| 250 | Rwanda (Rwandese Republic) | RW |
| 670 | Saipan | SN |
| 378 | San Marino | SM |
| 239 | Sao Tome and Principe | ST |
| 966 | Saudi Arabia | SA |
| 221 | Senegal | SE |
| 381 | Serbia and Montenegro | SX |
| 248 | Seychelles | SC |
| 232 | Sierra Leone | SL |
| 65 | Singapore | SG |
| 421 | Slovakia | SK |
| 386 | Slovenia | SV |
| 677 | Solomon Islands | SI |
| 252 | Somalia | SO |
| 27 | South Africa | SF |
| 34 | Spain | SP |
| 94 | Sri Lanka | LK |
| 290 | St. Helena | HL |
| 869 | St. Kitts/Nevis | KT |
| 758 | St. Lucia | LU |
| 508 | St. Pierre & (et) Miquelon (France) | SQ |
| 784 | St. Vincent | VC |
| 249 | Sudan | SD |
| 597 | Suriname | SR |
| 268 | Swaziland | WZ |
| 46 | Sweden | SW |
| 41 | Switzerland | SZ |
| 963 | Syrian Arab Republic (Syria) | SY |
| 689 | Tahiti (French Polynesia) | TA |
| 886 | Taiwan | TW |
| 7 | Tajikistan | TJ |
| 255 | Tanzania (includes Zanzibar) | TZ |
| 66 | Thailand | TH |
| 228 | Togo (Togolese Republic) | TG |
| 690 | Tokelau | TK |
| 676 | Tonga | TN |
| 868 | Trinidad and Tobago | TT |
| 216 | Tunisia | TS |
| 90 | Turkey | TU |
| 993 | Turkmenistan | TM |
| 688 | Tuvalu (Ellice Islands) | TV |
| 256 | Uganda | UG |
| 380 | Ukraine | UR |
| 971 | United Arab Emirates | UE |
| 44 | United Kingdom | UK |
| 598 | Uruguay | UY |
| 1 | USA | US |
| 7 | Uzbekistan | UZ |
| 678 | Vanuatu (New Hebrides) | VU |
| 39 | Vatican City | VT |
| 58 | Venezuela | VE |
| 84 | Viet Nam | VM |
| 340 | Virgin Islands (U.S.) | VI |
| 681 | Wallis and Futuna | WF |
| 685 | Western Samoa | WS |
| 381 | Yemen (People's Democratic Republic of) | YE |
| 967 | Yemen Arab Republic (North Yemen) | YM |
| 243 | Zaire | ZR |
| 260 | Zambia | ZM |
| 263 | Zimbabwe | ZW |

The foregoing is a list of 240 unique two-character country calling codes designed for use in telephone dialing, in which every two-letter code gives an optimal indication of the actual country being specified. By replacing numbers with letters, this aspect of the invention reduces, by at least one, the number of characters required to dial a telephone call. In addition, this aspect of the invention makes it far easier to remember the two characters of the country calling code, rather than remembering a series of numbers that do not contain a clue to the destination of the call.

In another illustrative embodiment, for calls to a device in the United States, its possessions or military states, in one example, each two-character area code is equivalent to the two-letter U.S. postal state or possession or military "state" abbreviation (postal code). The area codes may be stored in a memory of telecommunication system 2 in alphabetical order, as follows, by state name or possession name or by military "state" name, for example:

| State/possession | Area code |
|---|---|
| ALABAMA | AL |
| ALASKA | AK |
| AMERICAN SAMOA | AS |
| ARIZONA | AZ |
| ARKANSAS | AR |

| | |
|---|---|
| CALIFORNIA | CA |
| COLORADO | CO |
| CONNECTICUT | CT |
| DELAWARE | DE |
| DISTRICT OF COLUMBIA | DC |
| FEDERATED STATES OF MICRONESIA | FM |
| FLORIDA | FL |
| GEORGIA | GA |
| GUAM | GU |
| HAWAII | HI |
| IDAHO | ID |
| ILLINOIS | IL |
| INDIANA | IN |
| IOWA | IA |
| KANSAS | KS |
| KENTUCKY | KY |
| LOUISIANA | LA |
| MAINE | ME |
| MARSHALL ISLANDS | MH |
| MARYLAND | MD |
| MASSACHUSETTS | MA |
| MICHIGAN | MI |
| MINNESOTA | MN |
| MISSISSIPPI | MS |
| MISSOURI | MO |
| MONTANA | MT |
| NEBRASKA | NE |
| NEVADA | NV |
| NEW HAMPSHIRE | NH |
| NEW JERSEY | NJ |
| NEW MEXICO | NM |
| NEW YORK | NY |
| NORTH CAROLINA | NC |
| NORTH DAKOTA | ND |
| NORTHERN MARIANA ISLANDS | MP |
| OHIO | OH |
| OKLAHOMA | OK |
| OREGON | OR |
| PALAU | PW |
| PENNSYLVANIA | PA |
| PUERTO RICO | PR |
| RHODE ISLAND | RI |
| SOUTH CAROLINA | SC |
| SOUTH DAKOTA | SD |
| TENNESSEE | TN |
| TEXAS | TX |
| UTAH | UT |
| VERMONT | VT |
| VIRGIN ISLANDS | VI |
| VIRGINIA | VA |
| WASHINGTON | WA |
| WEST VIRGINIA | WV |
| WISCONSIN | WI |
| WYOMING | WY |

| Military "State" | Abbreviation |
|---|---|
| ARMED FORCES AFRICA | AE |
| ARMED FORCES AMERICAS (EXCEPT CANADA) | AA |
| ARMED FORCES CANADA | AE |
| ARMED FORCES EUROPE | AE |
| ARMED FORCES MIDDLE EAST | AE |
| ARMED FORCES PACIFIC | AP |

In this embodiment, use of the 50 foregoing two-letter, well known postal codes replaces dialing 350 three-digit numerical area codes. With this embodiment, 300 fewer area codes are needed in the U.S.

Similarly, in another illustrative embodiment, for calls to a device in Canada, as another example, each two-character area code is equivalent to a two-character province code. The area codes may be stored in a memory of telecommunication system 2 in alphabetical order, as follows, by province, for example:

| Province | Area code |
|---|---|
| Alberta | AB |
| British Columbia | BC |
| Manitoba | MB |
| New Brunswick | NB |
| Newfoundland | NF |
| Nova Scotia | NS |
| Ontario | OT |
| Prince Edward Island | PE |
| Quebec | QB |
| Saskatchewan | SK |
| Yukon | YK |

In another example, placing a telephone call to a telephone number in Canada would involve dialing one of the above area codes (a two-character abbreviation of a province name) and the telephone number. In the case of Ontario, its new area code, OT, replaces its present nine numerical codes of 226, 289, 416, 519, 613, 647, 705, 807, and 905.

Letter keys are already available on new cellular telephones which feature a computer keyboard. In these telephones, a standard integrated-circuit chip converts 127 input keys, including upper case letters, lower case letters, numbers, punctuation, etc. into seven-bit binary symbols, in accordance with the standard American Standard Code for Information Interchange (ASCII) digital coding scheme. An eight-bit expanded list is also available.

The number of area codes required to serve each telecommunication system 2 varies with the population of each state and the telephone number capacity of each area code. Present art area codes each service 7.92 million subscribers who share a mixture of landline, facsimile and cellular numbers. This approach requires hundreds of area codes to serve a country the size of the United States. With the low capacity of each background art area code, a telecommunication system that relied on two-character area codes would not have a sufficient number of area codes.

In an illustrative embodiment, the telecommunication system of U.S. Pat. No. 7,039,174 and described herein is used with an embodiment of the invention disclosed herein. Use of this telecommunication system allows a doubling of area code capacity and relies on eight-digit cellular numbers created by adding a * prefix to a conventional seven-digit telephone number. Each area code would then include another set of 7.92 million numbers containing the *prefix which would be reserved for use by cellular phones only. In this embodiment, two-character area codes have enough capacity to provide full service.

In another illustrative embodiment, the invention calls for reducing telephone area codes from three digits to two characters. This embodiment allows the use of an eight-digit cellular phone number without changing the total number of digits presently in use (ten digits=three-digit area code plus conventional seven-digit telephone). With this embodiment, changes to the telecommunication system software are required, but no changes are required to present art telephone instrumentation or handsets.

In yet another illustrative embodiment, where letters are fully available, telecommunication system 2 relies on two-character area codes that are equivalent to the two-character postal state abbreviations, such as: AL, AK, AZ, AR, CA, Cl, CO, etc. The Cl area code is an extra area code for California, which could also have, in an alternative embodiment, CN for northern California and CS for southern California. The 2-digit area code plus an 8-digit cellular number would preserve the long distance telephone number at its present 10 digits.

If seven letters were used instead of seven digits for a telephone number, the capacity of each area code would increase from the present 10 million ($10^7$) to eight billion ($26^7$) accounts. With this capacity, only one two-character area code is needed per state. (The present system has two million unavailable numbers starting with 0 or 1 and 80,000 reserved numbers for an actual total of 7.92 million).

Many variations of the invention will occur to those skilled in the art. Some variations include use of country dialing codes and area codes that are equivalent to two-character abbreviations. Other variations include use of area codes that are two-character state name abbreviations. All such variations are intended to be within the scope and spirit of the invention.

Although some embodiments are shown to include certain features or steps, the applicant specifically contemplates that any feature or step disclosed herein may be used together or in combination with any other feature or step on any embodiment of the invention. It is also contemplated that any feature or step may be specifically excluded from any embodiment of the invention.

What is claimed is:

1. In a telecommunication system that is capable of routing international telephone calls to a specific communications device of a particular subscriber in a country or dependent area and in an area of the country or dependent area, a system for routing a telephone call from a caller to said specific communications device, said system comprising:
   means for assigning a first telephone number to the particular subscriber; and
   means for routing the telephone call to the specific communications device of the particular subscriber by recognizing an international call prefix, a country calling code and an area code or city code;
   wherein said country calling code is a first two-character abbreviation for the country or dependent area; and
   wherein said area code is a second two-character abbreviation for a state, province, possession or military state of the country.

2. The system of claim 1 wherein said international call prefix is a reverse single quote which is the symbol.

3. The system of claim 1 wherein said country calling code is a two-letter code.

4. The system of claim 1 wherein said area code is a two-letter code.

5. The system of claim 1 wherein the two-character abbreviation for the country or dependent area is selected from the following list:

| | |
|---|---|
| Afghanistan | AF |
| Albania | AL |
| Algeria | AG |
| American Samoa | AS |
| Andorra | AD |
| Angola | AO |
| Anguilla | AI |
| Antigua | AN |
| Argentina | AR |
| Armenia | AM |
| Aruba | AA |
| Ascension Island | AC |
| Australia | AU |
| Australian External Territories | AE |
| Austria | AT |
| Azerbaijan | AZ |
| Bahamas | BS |
| Barbados | BB |
| Bahrain | BH |
| Bangladesh | BD |
| Belarus | BL |
| Belgium | BE |
| Belize | BZ |
| Benin | BN |
| Bermuda | BM |
| Bhutan | BT |
| British Virgin Islands | BG |
| Bolivia | BO |
| Bosnia and Hercegovina | BA |
| Botswana | BW |
| Brazil | BR |
| Brunei Darussalm | BU |
| Bulgaria | BG |
| Burkina Faso | BF |
| Burundi | BI |
| Cambodia | CB |
| Cameroon | CM |
| Canada | CA |
| CapeVerde Islands | CV |
| Cayman Islands | CI |
| Cape Verdi | CV |
| Central African Republic | CF |
| Chad | CD |
| Chile | CH |
| China (People's Republic) | CN |
| China-Taiwan | TW |
| Colombia | CO |
| Comoros and Mayotte | CS |
| Congo | CG |
| Cook Islands | CK |
| Costa Rica | CR |
| Croatia | CT or HR |
| Cuba | CU |
| Cyprus | CY |
| Czech Republic | CZ |
| Denmark | DK |
| Diego Garcia | DG |
| Dominca | DO |
| Dominican Republic | DR |
| Djibouti | DJ |
| Ecuador | EC |
| Egypt | EG |
| El Salvador | ES |
| Equatorial Guinea | EQ |
| Eritrea | ER |
| Estonia | EN |
| Ethiopia | ET |
| Falkland Islands | FK |
| Faroe (Faeroe) Islands (Denmark) | FO |
| Fiji | FJ |
| Finland | FI |
| France | FR |
| French Antilles | FA |
| French Guiana | FG |
| Gabon (Gabonese Republic) | GB |
| Gambia | GA |
| Georgia | GG |
| Germany | GM |
| Ghana | GH |
| Gibraltar | GI |
| Greece | GR |
| Greenland | GL |
| Grenada/Carricou | GD |
| Grenadines | GD |
| Guam | GU |
| Guatemala | GT |
| Guinea | GN |
| Guinea-Bissau | GS |
| Guyana | GY |
| Haiti | HT |
| Honduras | HO |
| Hong Kong | HK |
| Hungary | HU |
| Iceland | IC |
| India | IN |

| | |
|---|---|
| Indonesia | ID |
| Iran | IR |
| Iraq | IQ |
| Ireland (Irish Republic; Eire) | IL |
| Israel | IS |
| Italy | IT |
| Ivory Coast (La Cote d'Ivoire) | IV |
| Jamaica | JM |
| Japan | JP |
| Jordan | JO |
| Kazakhstan | KZ |
| Kenya | KE |
| Khmer Republic (Cambodia/Kampuchea) | KR |
| Kiribati Republic (Gilbert Islands) | KI |
| Korea, Republic of (South Korea) | KS |
| Korea, People's Republic of (North Korea) | KN |
| Kuwait | KU |
| Kyrgyz Republic | KG |
| Latvia | LV |
| Laos | LA |
| Lebanon | LB |
| Lesotho | LO |
| Liberia | LI |
| Lithuania | LT |
| Libya | LY |
| Liechtenstein | LS |
| Luxembourg | LX |
| Macao | MC |
| Macedonia | MA |
| Madagascar | MD |
| Malawi | MW |
| Malaysia | MY |
| Maldives | MI |
| Mali | ML |
| Malta | MT |
| Marshall Islands | MH |
| Martinique (French Antilles) | MQ |
| Mauritania | MR |
| Mauritius | MU |
| Mayolte | ME |
| Mexico | MX |
| Micronesia (F.S. of Polynesia) | FM |
| Moldova | MV |
| Monaco | MN |
| Mongolia | MG |
| Montserrat | MS |
| Morocco | MO |
| Mozambique | MZ |
| Myanmar (former Burma) | MM |
| Namibia (former South-West Africa) | NM |
| Nauru | NR |
| Nepal | NP |
| Netherlands | NL |
| Netherlands Antilles | NA |
| Nevis | NV |
| New Caledonia | NC |
| New Zealand | NZ |
| Nicaragua | NU |
| Niger | NI |
| Nigeria | NG |
| Niue | NE |
| North Korea | NK |
| North Mariana Islands (Saipan) | MI |
| Norway | NO |
| Oman | OM |
| Pakistan | PK |
| Palau | PU |
| Panama | PM |
| Papua New Guinea | PG |
| Paraguay | PY |
| Peru | PE |
| Philippines | PH |
| Poland | PL |
| Portugal (includes Azores) | PO |
| Puerto Rico | PR |
| Qatar | QA |
| Reunion (France) | RE |
| Romania | RO |
| Russia | RU |
| Rwanda (Rwandese Republic) | RW |
| Saipan | SN |
| San Marino | SM |
| Sao Tome and Principe | ST |
| Saudi Arabia | SA |
| Senegal | SE |
| Serbia and Montenegro | SX |
| Seychelles | SC |
| Sierra Leone | SL |
| Singapore | SG |
| Slovakia | SK |
| Slovenia | SV |
| Solomon Islands | SI |
| Somalia | SO |
| South Africa | SF |
| Spain | SP |
| Sri Lanka | LK |
| St. Helena | HL |
| St. Kitts/Nevis | KT |
| St. Lucia | LU |
| St. Pierre &(et) Miquelon (France) | SQ |
| St. Vincent | VC |
| Sudan | SD |
| Suriname | SR |
| Swaziland | WZ |
| Sweden | SW |
| Switzerland | SZ |
| Syrian Arab Republic (Syria) | SY |
| Tahiti (French Polynesia) | TA |
| Taiwan | TW |
| Tajikistan | TJ |
| Tanzania (includes Zanzibar) | TZ |
| Thailand | TH |
| Togo (Togolese Republic) | TG |
| Tokelau | TK |
| Tonga | TN |
| Trinidad and Tobago | TT |
| Tunisia | TS |
| Turkey | TU |
| Turkmenistan | TM |
| Tuvalu (Ellice Islands) | TV |
| Uganda | UG |
| Ukraine | UR |
| United Arab Emirates | UE |
| United Kingdom | UK |
| Uruguay | UY |
| USA | US |
| Uzbekistan | UZ |
| Vanuatu (New Hebrides) | VU |
| Vatican City | VT |
| Venezuela | VE |
| Viet Nam | VM |
| Virgin Islands (U.S.) | VI |
| Wallis and Futuna | WF |
| Western Samoa | WS |
| Yemen (Peoples Democratic Republic of) | YE |
| Yemen Arab Republic (North. Yemen) | YM |
| Zaire | ZR |
| Zambia | ZM |
| Zimbabwe | ZW. |

6. The system of claim 1 wherein the two-character abbreviation for the state, province, possession or military state is selected from the following list:

| | |
|---|---|
| ALABAMA | AL |
| ALASKA | AK |
| AMERICAN SAMOA | AS |
| ARIZONA | AZ |
| ARKANSAS | AR |
| CALIFORNIA | CA |
| COLORADO | CO |
| CONNECTICUT | CT |
| DELAWARE | DE |
| DISTRICT OF COLUMBIA | DC |
| FEDERATED STATES OF MICRONESIA | FM |
| FLORIDA | FL |

-continued

| | |
|---|---|
| GEORGIA | GA |
| GUAM | GU |
| HAWAII | HI |
| IDAHO | ID |
| ILLINOIS | IL |
| INDIANA | IN |
| IOWA | IA |
| KANSAS | KS |
| KENTUCKY | KY |
| LOUISIANA | LA |
| MAINE | ME |
| MARSHALL ISLANDS | MH |
| MARYLAND | MD |
| MASSACHUSETTS | MA |
| MICHIGAN | MI |
| MINNESOTA | MN |
| MISSISSIPPI | MS |
| MISSOURI | MO |
| MONTANA | MT |
| NEBRASKA | NE |
| NEVADA | NV |
| NEW HAMPSHIRE | NH |
| NEW JERSEY | NJ |
| NEW MEXICO | NM |
| NEW YORK | NY |
| NORTH CAROLINA | NC |
| NORTH DAKOTA | ND |
| NORTHERN MARIANA ISLANDS | MP |
| OHIO | OH |
| OKLAHOMA | OK |
| OREGON | OR |
| PALAU | PW |
| PENNSYLVANIA | PA |
| PUERTO RICO | PR |
| RHODE ISLAND | RI |
| SOUTH CAROLINA | SC |
| SOUTH DAKOTA | SD |
| TENNESSEE | TN |
| TEXAS | TX |
| UTAH | UT |
| VERMONT | VT |
| VIRGIN ISLANDS | VI |
| VIRGINIA | VA |
| WASHINGTON | WA |
| WEST VIRGINIA | WV |
| WISCONSIN | WI |
| WYOMING | WY |
| ARMED FORCES AFRICA | AE |
| ARMED FORCES AMERICAS (EXCEPT CANADA) | AA |
| ARMED FORCES CANADA | AE |
| ARMED FORCES EUROPE | AE |
| ARMED FORCES MIDDLE EAST | AE |
| ARMED FORCES PACIFIC | AP. |

7. The system of claim 1 wherein the two-character abbreviation for the state, province, possession or military state is selected from the following list:

| | |
|---|---|
| Alberta | AB |
| British Columbia | BC |
| Manitoba | MB |
| New Brunswick | NB |
| Newfoundland | NF |
| Nova Scotia | NS |
| Ontario | OT |
| Prince Edward Island | PE |
| Quebec | QB |
| Saskatchewan | SK |
| Yukon | YK. |

8. The system of claim 1 wherein said area code is a two-letter postal state abbreviation for the desired state, possession or military state.

9. A telecommunication system comprising:
a call routing system and a plurality of telephones that are connected to said call routing system;
wherein each of said telephones is situated within a country or dependent area having a country calling code and within an area of the country or dependent area having an area code; and
wherein said call routing system is operated by a software program that accepts a two-character abbreviation for the country or dependent area as said country calling code and a two-character postal state abbreviation for a state, province, possession or military state as said area code.

10. A telecommunication system comprising:
a call routing system; and
a plurality of telephones that are connected to said call routing system;
wherein each of said telephones comprises a keypad having a dedicated key that when pressed or dialed causes said telephone to send a signal to said call routing system indicating that said call is a long distance call; and
wherein said call routing system is operated by a software program that accepts a country calling code that is a first two-character abbreviation for said country or dependent area and an area code that is a second two-character abbreviation for a state or province.

11. The telecommunication system of claim 10 wherein, said dedicated key is labeled "L-D."

12. A method of processing an international call, the method comprising:
informing a customer of a telecommunication system that is capable of routing calls to a plurality of communications devices of said customer that one of a plurality of unique sets of symbol headings is associated with one type of communications device that is connectable to said telecommunication system;
assigning one of a plurality of telephone numbers available within a country having a country calling code and within an area of said country having an area code to said customer of said telecommunication system and granting said customer having a specific communications device that is connected to said telecommunication system the exclusive right to optionally use a combination comprising any one of said unique sets of symbol headings plus said telephone number to identify said specific communications device other than a voice landline device to the other customers of said telecommunication system, said specific communications device being identified as one of said plurality of communications devices of said customer;
receiving a sequence of signals representing an international call prefix, said country calling code and said area code plus a specific set of symbol headings plus a specific telephone number that has been dialed by a caller, the combination of the specific set of symbol headings plus said specific telephone number and no other telephone number alone identifying said specific communications device that is the destination for the international call; and
connecting the international call to said specific communications device that is the destination for the international call without the need for said telecommunication system to determine the type of communications device to which the international call is directed;
wherein said country calling code is a first two-character abbreviation for said country; and wherein said area code is a second two-character abbreviation for a state, province, possession or military state of said country.

13. A system for processing an international call made to a telephone number in a country having a country calling code and in an area of the country having an area code and directed to a specific communications device to which that telephone number is assigned, the system comprising:

means for announcing to a customer of a telecommunication system that is capable of routing calls to a plurality of communications devices of the customer that one of a plurality of suggested sets of symbol headings is associated with a single type of communications device that is connectable to a telecommunication system;

means for assigning one of a plurality of telephone numbers to the customer of the telecommunication system and granting the customer having a specific communications device the exclusive right to optionally use a combination comprising any one of said suggested sets of symbol headings plus said telephone number to identify the specific communications device to other customers of the telecommunication system, the specific communications device being identified as one of the plurality of communications devices of the customer;

a sequence of signals representing a specific set of symbol headings and a specific telephone number that have been dialed by a caller, the sequence of signals being the sole directory number for the specific communications device, the set of symbol headings immediately preceding the telephone number, being distinguishable from said telephone number and together with said telephone number defining a destination for said call; and a routing apparatus having a switching component and an identification component for determining the intended destination of the call and connecting the call to that destination without the need for the telecommunication system to determine the type of communications device to which the call is directed;

wherein only one specific communications device of each selected customer has its own telephone number; and wherein no other communications device shares a line with said specific communications device;

wherein said country calling code is a first two-character abbreviation for a country or dependent area; and wherein said area code is a second two-character abbreviation for a state, province, possession or military state.

14. A routing system for directing international telephone calls to different communications devices having identical voice landline telephone numbers, said system comprising:

an administrative subsystem comprising means for informing a customer of a telecommunication system that is capable of routing calls to a plurality of communications devices of the customer that one of a plurality of symbol headings is normally associated with each type of communications device that is connectable to a telecommunication system and means for assigning one of a plurality of telephone numbers to the customer of the telecommunication system and granting said the customer having a specific communications device the exclusive right to optionally use a combination comprising any one of said plurality of symbol headings plus said telephone number to identify the specific communications device to other customers of the telecommunication system, the specific communications device being identified as one of the plurality of communications devices of the customer;

a network subsystem having routing apparatus including a switching component and an identification component for processing a call to a destination located in a country or dependent area having a country calling code and in an area of the country or dependent area having an area code, the call including a sequence of signals indicating a particular one of said plurality of symbol headings and a particular telephone number that have been dialed by a caller, the sequence of signals being the sole directory number for the specific communications device; and at least one communications device assigned to a telephone number;

wherein said particular one of said plurality of symbol headings does not indicate to said routing apparatus that the specific communications device is a particular type of communications device;

wherein only one specific communications device of each selected customer has its own telephone number;

wherein no other communications device shares a line with said specific communications device;

wherein said country calling code is a first two-character abbreviation for a country or dependent area; and wherein said area code is a second two-character abbreviation for a state, province, possession or military state.

\* \* \* \* \*